(12) United States Patent
Shindo et al.

(10) Patent No.: US 12,463,007 B2
(45) Date of Patent: Nov. 4, 2025

(54) ELECTRON MICROSCOPE ANALYSIS SYSTEM

(71) Applicant: RIKEN, Wako (JP)

(72) Inventors: Daisuke Shindo, Wako (JP); Takeshi Tomita, Wako (JP)

(73) Assignee: RIKEN, Saitama (JP)

( * ) Notice: Subject to any disclaimer, the term of this patent is extended or adjusted under 35 U.S.C. 154(b) by 286 days.

(21) Appl. No.: 18/010,088

(22) PCT Filed: May 27, 2021

(86) PCT No.: PCT/JP2021/020294
§ 371 (c)(1),
(2) Date: Dec. 13, 2022

(87) PCT Pub. No.: WO2021/256212
PCT Pub. Date: Dec. 23, 2021

(65) Prior Publication Data
US 2023/0223232 A1   Jul. 13, 2023

(30) Foreign Application Priority Data
Jun. 18, 2020   (JP) .................. 2020-105201

(51) Int. Cl.
*H01J 37/26*   (2006.01)
*G01N 23/20058*   (2018.01)

(52) U.S. Cl.
CPC ...... *H01J 37/263* (2013.01); *G01N 23/20058* (2013.01)

(58) Field of Classification Search
CPC ........... H01J 37/263; H01J 2237/24455; H01J 37/222; H01J 37/295; G01N 23/20058; G01N 23/04; G01N 23/2055
See application file for complete search history.

(56) References Cited

U.S. PATENT DOCUMENTS 8,253,099 B2 * 8/2012 Nicolopoulos ......... H01J 37/05
250/311
9,551,674 B1   1/2017 Wang et al.
(Continued)

FOREIGN PATENT DOCUMENTS

JP   2017-117612 A2   6/2017
WO  2013114464 A1    8/2013

OTHER PUBLICATIONS

Search Report mailed Aug. 17, 2021 in International Application No. PCT/JP2021/020294.
(Continued)

*Primary Examiner* — David E Smith
*Assistant Examiner* — Laura Eloise Tandy
(74) *Attorney, Agent, or Firm* — Miles & Stockbridge, P.C.

(57) ABSTRACT

An electron microscope analysis system includes a detector that captures an electron microscope image formed on a detection plane by an electron beam that irradiates a specimen to be observed and transmits through the specimen. Electrons each having a de Broglie wave motion are integrated to be a linear rotor that is a collection of the electrons each having the de Broglie wave motion, so that each electron can be recognized, the principle of conservation of electric charge can be satisfied, and interaction with the specimen can be calculated. The electron is represented as a detection point on the detection plane, for comparison with actual measurement data when the number of electrons is small, to reduce damage of the specimen by the electron beam, and to obtain information of the specimen when an amount of irradiation is small.

5 Claims, 12 Drawing Sheets

(56) References Cited

U.S. PATENT DOCUMENTS

2008/0067375 A1* 3/2008 Kasai .................. G03H 5/00
                                                        250/310
2014/0332684 A1   11/2014 Harada et al.
2017/0281102 A1* 10/2017 Ken .................... G01N 23/20
2021/0302333 A1*  9/2021 Henstra .............. H01J 37/04

OTHER PUBLICATIONS

Written Opinion mailed Aug. 17, 2021 in International Application No. PCT/JP2021/020294.
Dr. Walter Glaser, "Grundlagen der Elektronenoptik", Wien Springer-Verlag, 1952, pp. 7-10, 54-63, 184-187, 346-362.
J.M.Cowley, et al. "The Scattering of Electrons by Atoms and Crystals. I. A New Theoretical Approach", ActaCryst (1957). 10, pp. 609-619.
Takafumi Sato, et al., "Electron Holography Study of Secondary Electron Distribution around Charged Epoxy Resin", Materials Transactions, vol. 60 (2019) Issue 10, pp. 2114-2119.
A. Tonomura, et.al, "Demonstration of single-electron buildup of an interference pattern", American Journal of Physics 57 (1989), pp. 117-120.

* cited by examiner

ELECTRON THAT ORBITS
ATOMIC NUCLEUS

FIG. 2B

ELECTRON DIFFRACTED
BY CRYSTAL LATTICE

| PARAMETERS AND CONSTANTS | SYMBOLS | NUMERICAL VALUES USED IN SIMULATION |
|---|---|---|
| ELECTRON ENERGY | E | 300 keV |
| WAVE NUMBER | $k_0$ | $1.95 \times 10^7$ mm$^{-1}$ |
| DISTANCE BETWEEN ELECTRON SOURCE AND WIRE | $r_0$ | 200 mm |
| DISTANCE BETWEEN WIRE AND OBSERVATION PLANE | $z'$ | 71 mm |
| WIRE DIAMETER | $2a$ | $5 \times 10^{-4}$ mm |
| DISTANCE BETWEEN WIRE AND GROUNDING POLE | $2b$ | 1 mm |
| WIRE APPLICATION VOLTAGE | $\varphi_w$ | 35 V |

ELECTRON MICROSCOPE ANALYSIS SYSTEM

TECHNICAL FIELD

The present invention relates to an electron microscope analysis system. More specifically, the present invention relates to a low dose electron microscope analysis technique by generalized trajectory calculation.

BACKGROUND ART

At present, various devices that examine the characteristic, structure, and the like of a material by using an electron accelerated to approximately several 10 keV to 1000 keV are widely used. Among them, an electron microscope using an electron beam by obtaining a hint from an optical microscope obtains the enlarged transmission image, the secondary electron image, and the diffraction pattern of a specimen, and by being provided with various analysis devices, also performs the evaluation and observation of various physical amounts such as the energy analysis of the electron beam that interacts with the specimen, image formation by the energy-selected electron, and the electromagnetic field observation of the inside and the periphery of the specimen.

In the material structure analysis by the electron beam, for the interpretation of the high magnification transmission image, the diffraction pattern, or the like of the specimen, the electron is represented as wave motion by the wave motion function used in quantum mechanics, the interference image or the electron diffraction pattern between the wave motion subjected to phase modulation by the interaction with the electromagnetic field created by the material structure assumed and the wave motion transmitted without being influenced by the electromagnetic field of the specimen is calculated, and the calculated comparison and examination of the interference image or the electron diffraction pattern and the image or the electron diffraction pattern of the assumed structure are performed, thereby performing the confirmation and identification of the structure. That is, the electron emitted from the electron source (electron gun) is controlled in its trajectory by the electrostatic lens and the magnetic field lens of the irradiation system, the deflection system, and the like so as to irradiate, as a particle (point) having $e^-$ electric charge, the specimen at the appropriate irradiation angle, and electron beam density (see NPTL 1).

Figure 1A:
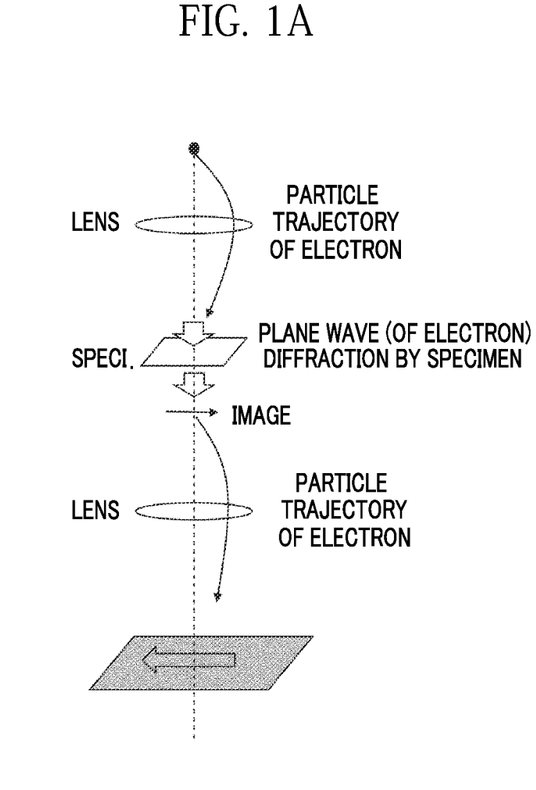
FIGS. 1A and 1B are diagrams for explaining the difference in the diffraction pattern and the image simulation between a conventional art and the present invention.
Figure 1B:
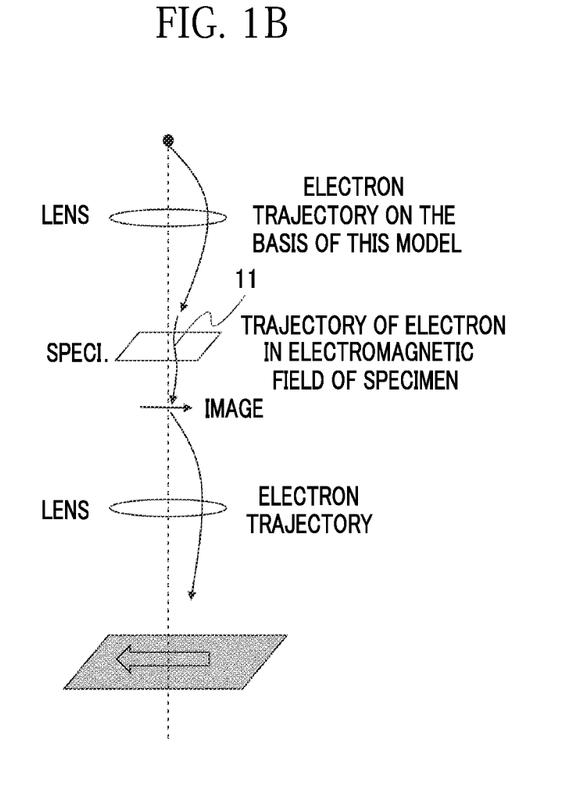

When the relatively low magnification image is obtained, the analysis and evaluation of the image are performed by calculating and evaluating the particle trajectory of the electron scattered by the specimen with respect to the irradiation conditions of each electron beam. However, in the case of the high magnification transmission image, the contrast of the image mainly depends on the phase, not on the amplitude, of the electron beam, and is calculated by replacing the electron incident on the specimen with a plane wave at the time of incidence (see NPTL 2). That is, as illustrated in FIG. 1A, the particle trajectory of the electron is calculated and evaluated to the cross-over just above the specimen (Speci), but the electron is treated as a spherical wave from the electron source or the cross-over just above the specimen, and is handled by the plane wave as one enabling plane wave approximation on the specimen surface located at a sufficiently distant position.

In this way, the case where the electron that is the same elementary particle is handled as the particle and the case where the electron is handled as the wave function are mixed. The experiment that has been performed so far for the interference of the electron beam proves that the detection point of each electron is accumulated on the detection plane to form the interference image (see NPTL 3), and the detector detects each electron, and does not detect the existence probability.

Also, as another example, the state of the turbulence of the electric field created when, at the time of irradiating the specimen with the electron beam, the electron emitted from the specimen stays in the periphery of the specimen or flows back to the surface of the specimen is observed by using electron beam holography (see NPTL 4).

Figure 2A:
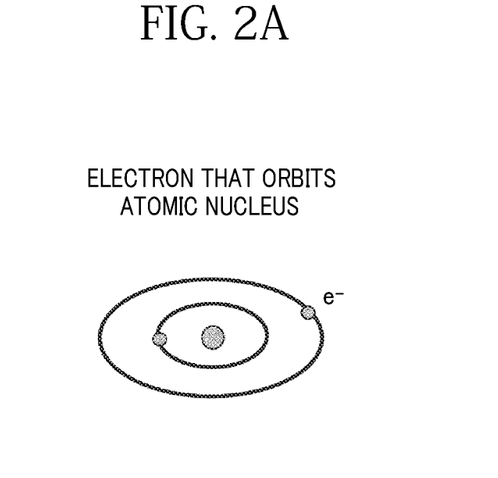
FIGS. 2A and 2B are diagrams for explaining the trajectory and the traveling direction of each electron.
Figure 2B:
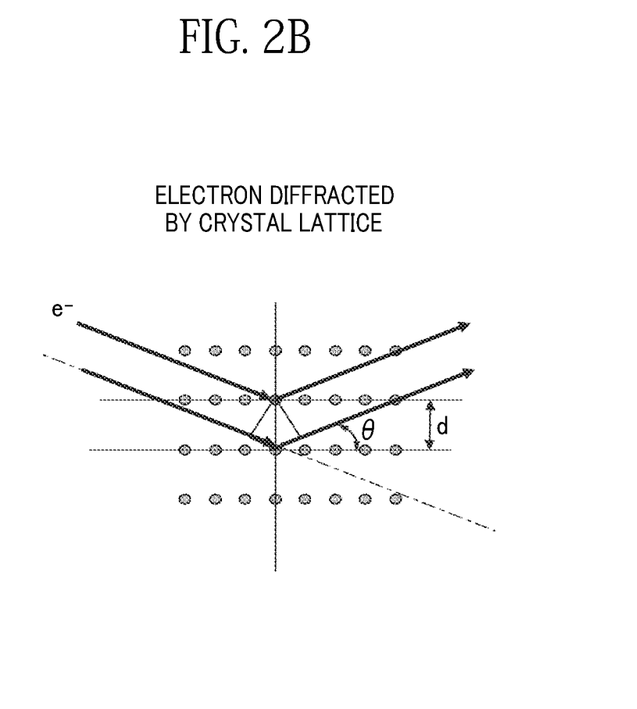

Therefore, it is considered that each electron can be handled as each electron consistently from the electron source to the detection plane, and for its trajectory, the wave nature that the electron has is assumed to be involved. For example, as a representative case of the trajectory of the electron, as illustrated in FIGS. 2A and 2B, for the traveling direction of the electron, the smoothly connected state and direction (stable state) with no change in the phase of a de Broglie wave (hereinafter, a de Broglie wave) are selected. That is, in FIG. 2A, when the trajectory of the electron is an integral multiple of the de Broglie wavelength $\lambda$, the trajectory is stably held, and in FIG. 2B, the electron travels in the direction in which the optical path difference is an integral multiple of the de Broglie wavelength $\lambda$.

CITATION LIST

Patent Literature

NPTL 1: Dr. Walter Glaser, "Grundlagen der Elektroneoptik", Wien Springer-Verlag, 1952
NPTL 2: J. M. Cowley, and A. F. Moodie, "The Scattering of Electrons by Atoms and Crystals, I. A New Theoretical Approach", ActaCryst (1957), 10, 609
NPTL 3: A. Tonomura, et. al, "Demonstration of single-electron buildup of an interference pattern", American Journal of Physics 57, 117 (1989)
NPTL 4: Takafumi Sato, et al, "Electron Holography Study of Secondary Electron Distribution around Charged Epoxy Resin", MATERIALS TRANSACTIONS, Volume 60 (2019) Issue 10, pp. 2114-2119

SUMMARY OF INVENTION

Technical Problem

As described above, in the simulation performed at present with respect to the high magnification specimen image by the electron microscope or the like, the electron that irradiates the specimen is handled, as the plane wave of the de Broglie, by using the wave function of quantum mechanics. Specifically, the waves are divided into the wave in which the plane wave is incident on the specimen and transmits therethrough as-is and the wave that causes diffraction by the electromagnetic field of the specimen, and the two waves are caused to interfere with each other by being superposed on the image plane by the objective lens, thereby forming the image (NPTL 2).

Figures 3A, 3B, 3C:
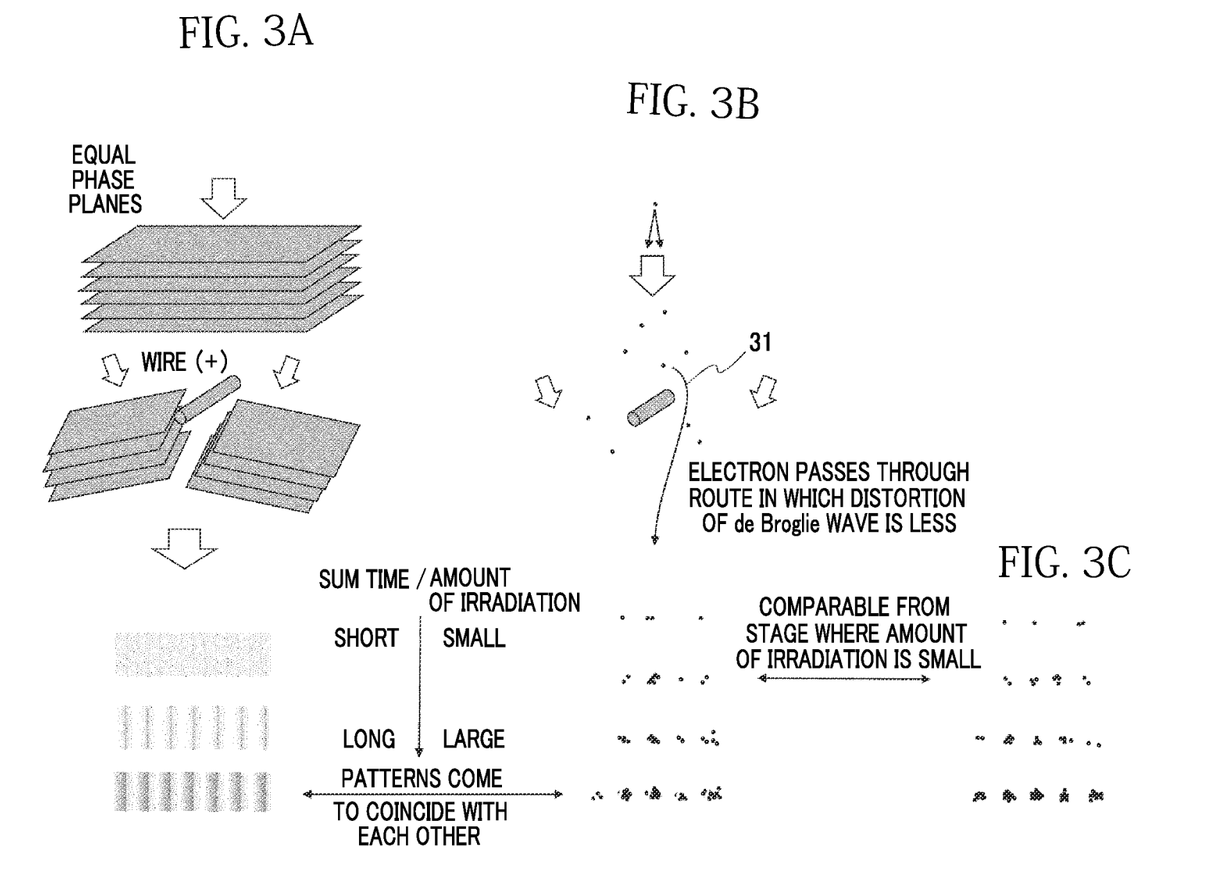
FIGS. 3A to 3C are diagrams for explaining the difference in the simulation result image between the conventional art and the present invention.

The image or the diffraction pattern is calculated by using the wave function $\langle \Psi |$, as the existence probability of the electron by $|\Psi|^2$, that is, as the position distribution of the probability at which the electron is detected. However, in the detection of the actual image, the position of each electron that has passed through an electron trajectory 11 and reached the detection plane is detected, and the sum of the positions of the electrons is performed, thereby forming the image on the detection plane. Therefore, as illustrated in FIGS. 3A and 3B, to compare the diffraction pattern or the image of the specimen by the electron that is actually detected and the diffraction pattern or the image by the simulation, the irradiation of a large amount of electron beam is required until the contrast becomes continuously smooth. Consequently, in the specimen in which the damage of the specimen by the irradiation electron is severe such as a high polymer specimen and a biological high polymer specimen, the specimen is often damaged before the amount of irradiation for obtaining reliable specimen information is reached.

To solve the problems by the present invention in view of the above circumstances, an object of the present invention is to be able to obtain the information of a specimen to a maximum while reducing the damage of the specimen by electron irradiation to a minimum by simulation in which an electron incident on the specimen and an electron that interacts with the specimen to reach a detection plane in an electron microscope or the like are not handled by a existence probability with the use of a wave function, there is no contradiction with the actual detection condition, and comparison with detected data is easily performed from the stage where the amount of electric current for irradiating the specimen is small, and the information of the specimen is easily obtained and an electron microscope analysis system on the basis of that.

Solution to Problem

To solve the above problems, the present invention provides an electron microscope analysis system that uses a detection image by an electron microscope including a detection unit that detects an electron microscope image formed on a detection plane by applying an electron beam onto a specimen to be observed and transmitting the electron beam through the specimen and a simulation image by an electron model of a spinning linear matter wave and performs comparison and examination. By the above inherent electron model, the comparison with the electron detection image is enabled from the stage where the amount of electron irradiation is small.

Figure 9:
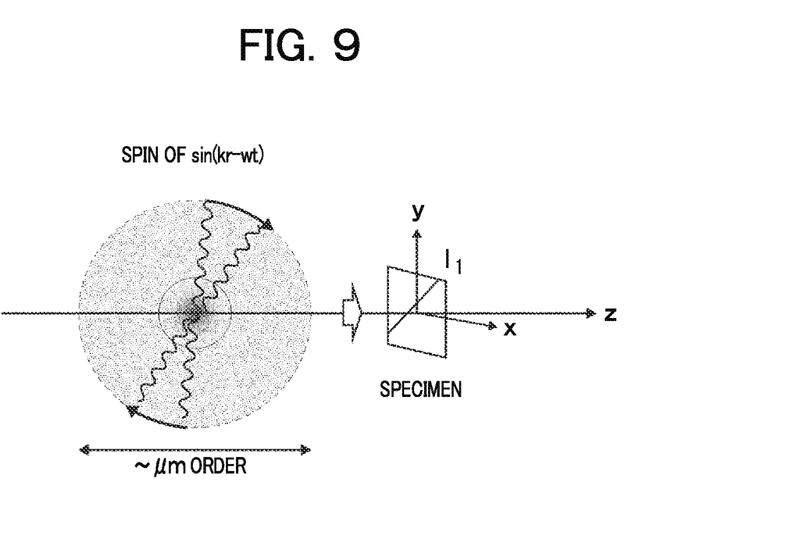
FIG. 9 is a diagram for explaining the simulation by a spinning linear matter wave according to the present invention.

That is, in the present invention, in order that the contradiction of the electron position obtained only as the distribution of the existence probability and the presence of the clear detection position in the actual electron detection can be eliminated and the movement of the electron can be described, the electron is not represented as the wave function, and as illustrated in FIG. 9, is considered as the spinning linear matter wave (de Broglie wave) in such a manner that the electric charge is linearly distributed and spins at high speed (corresponding to the spin angular momentum of $h/4\pi$) and that the center point of the line represents the electron position. In the electron, each electron position is detected as the center of the spinning linear matter wave, and thus coincides with the actual detection state, thereby enabling the comparison and examination of the simulation and the actual measurement from the state where the amount of irradiation is small.

Also, the electron microscope analysis system of the present invention is configured to be able to control the electron microscope by using information technology (IT)) by an electron source (electron gun) that enables single electron irradiation control using a photoelectric effect, a diffraction pattern, and specimen image simulation software, can irradiate the specimen held by a specimen holder while controlling the number of incident electrons, can perform the comparison of the diffraction pattern obtained and the image simulation, and can execute the analysis while confirming the damage of the specimen by the irradiation.

Advantageous Effects of Invention

According to the present invention, the electron incident on the specimen is treated as the linear rotor having the de Broglie wave, so that unlike the incidence of the plane wave, the electron can be recognized as each electron, the principle of conservation of electric charge can be satisfied, and the interaction with the specimen inside the specimen can also be calculated. Also, the electron is not evaluated as the existence probability having a spread on the detection plane, and is represented as the detection point, so that the comparison with the actual measurement data is easily performed from the state where the number of electrons is small, the damage of the specimen by the electron beam can be reduced, and the information of the specimen is easily obtained from the stage where the amount of irradiation is small.

DESCRIPTION OF EMBODIMENTS

An embodiment of the present invention will be successively described below with reference to the drawings.

Example 1

Example 1 is an example of an electron microscope analysis system. That is, Example 1 is an example of an electron microscope analysis system, the electron microscope analysis system including a detector that captures an electron microscope image formed on a detection plane by applying an electron beam onto a specimen and transmitting the electron beam through the specimen, and analyzing the electron beam that forms the electron microscope image by using an electron model having a spinning linear matter wave (de Broglie wave) that spins about a predetermined point on the irradiation beam.

Figure 4:
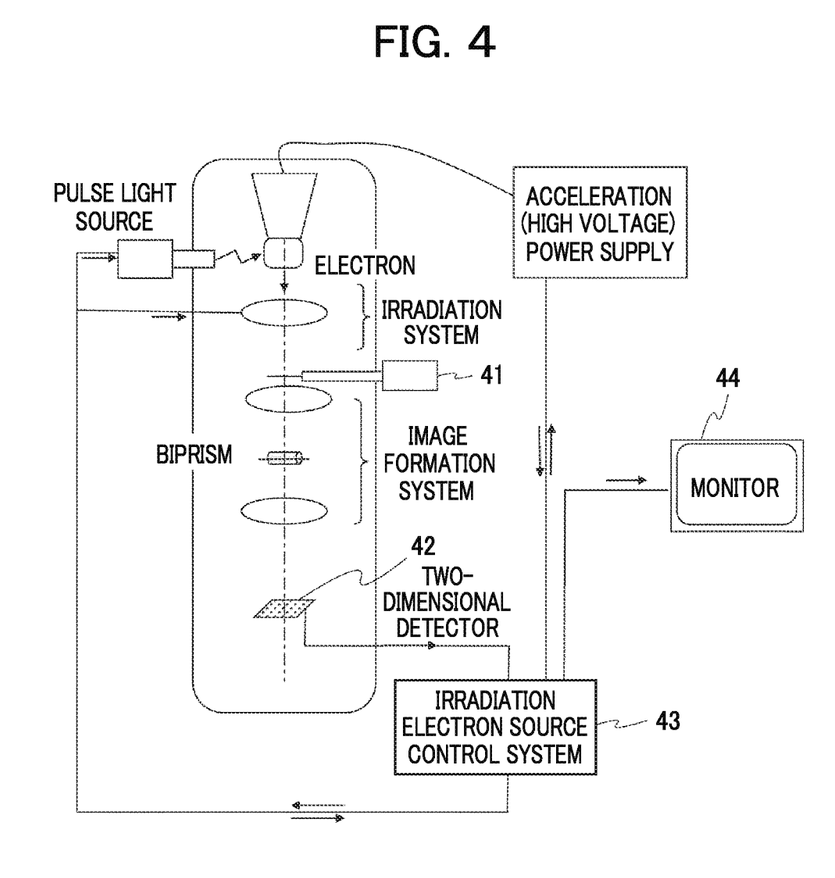
FIG. 4 is a diagram illustrating a configuration example of a low dose electron microscope analysis system according to Example 1.

FIG. 4 illustrates an example of the system configuration of this example. That is, FIG. 4 illustrates the electron microscope analysis system, the electron microscope analysis system including a biprism and a joining holder installed in a transmission electron microscope, and being capable of bringing the biprism and the joining holder closer to the surface of the specimen with the confirmation of the state of the integration of secondary electrons by the amplitude contrast image of the biprism.

In the drawing, an electron that is emitted from an electron source and passes through an irradiation system is applied onto the specimen held by a specimen holder 41, and is detected by a two-dimensional detector 42 through an image formation system including the biprism and the like. The detection signal is appropriately converted to image information by an irradiation electron source control system 43, and is displayed on a monitor 44. As described above, the irradiation electron source control system 43 performs the comparison of the simulation by IT and the data of the two-dimensional detector 42.

Figure 10A:
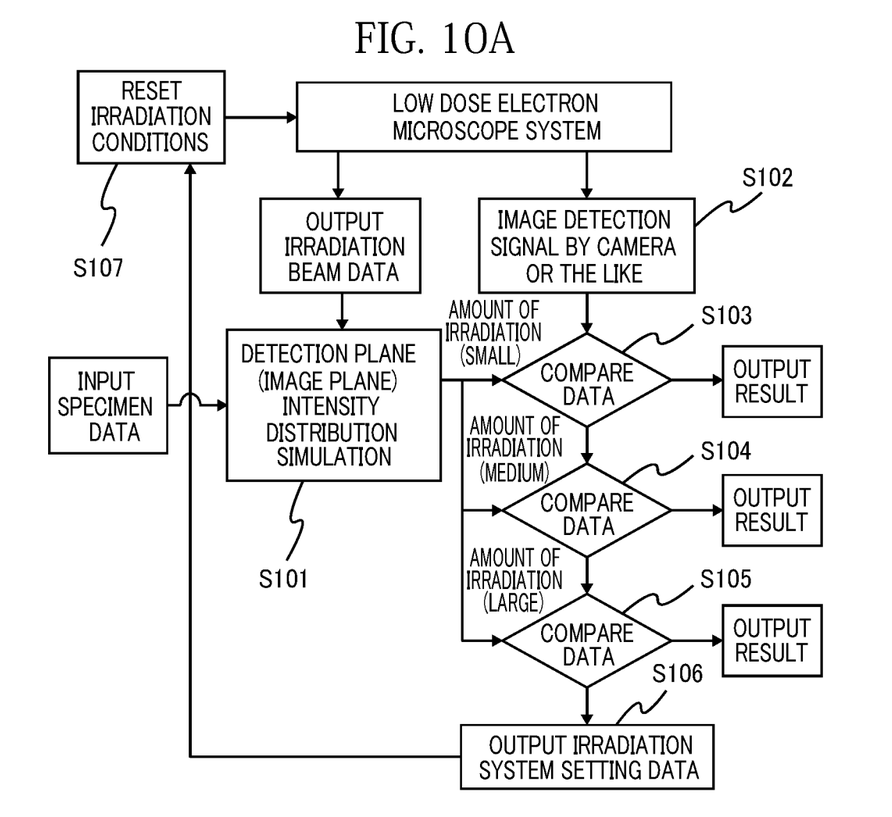
FIGS. 10A and 10B are diagrams illustrating an example of the comparison analysis procedure of the low dose electron microscope analysis system according to Example 1.
Figure 10B:
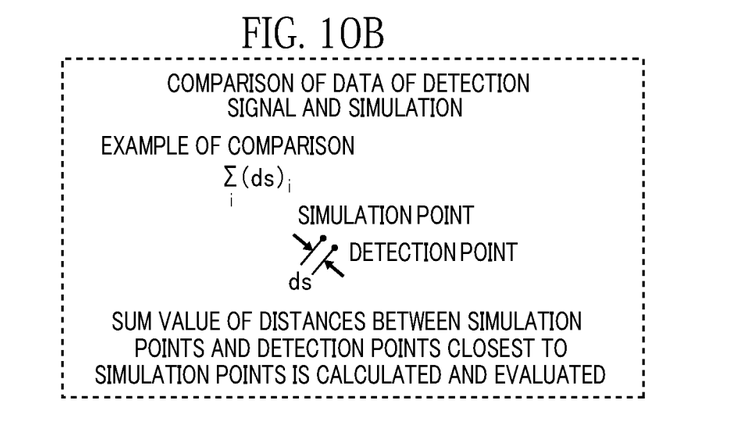

FIGS. 10A and 10B are diagrams illustrating an example of the comparison analysis procedure of the low dose electron microscope analysis system according to Example 1, and the electron microscope analysis system outputs irradiation beam data, and outputs an image detection signal by a camera or the like (S102). The output of the irradiation beam data is used for performing detection plane (image plane) intensity distribution simulation (S101) together with the input of specimen data. The detection plane (image plane) intensity distribution simulation is compared with the image detection signal in each of the small, medium, and large amounts of irradiation (S103 to S105), and the result is outputted. As illustrated in FIG. 10B, for the data comparison, the sum value of the distances between the simulation points and the detection points closest to the simulation points is calculated and evaluated. Then, from the result, irradiation system setting data is outputted (S106), and irradiation conditions resetting is performed (S107).

In this way, the irradiation electron source control system 43 performs the necessary electron emission and acceleration control by controlling the acceleration (high voltage) power supply and the pulse light source. That is, by referring to the comparison result and the like, feedback to the pulse light source and the acceleration power supply is performed, so that while the amount of irradiation beam is controlled, the damage of the specimen can be reduced to obtain the information of the specimen.

Figure 5:
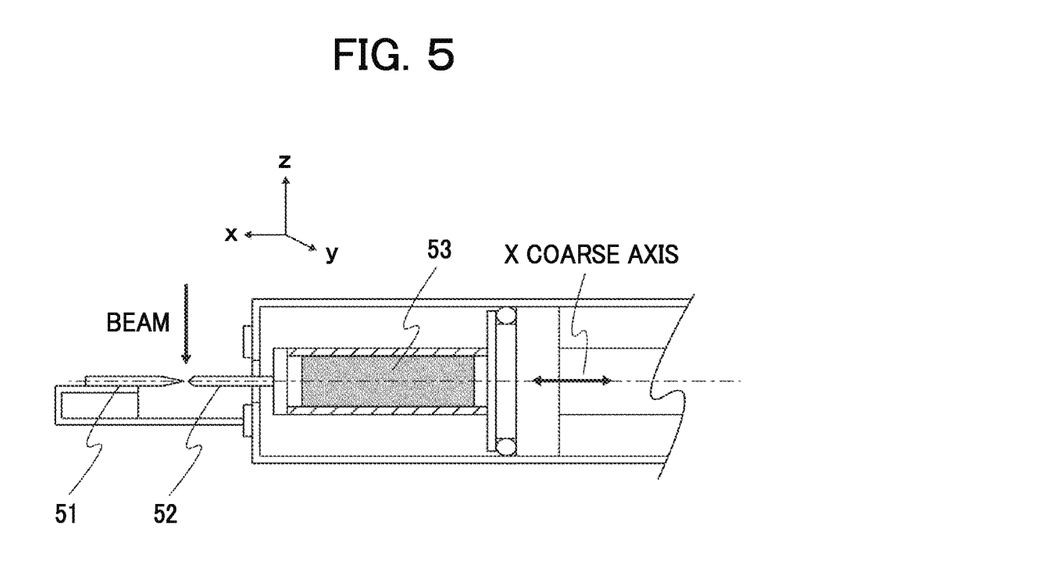
FIG. 5 is a diagram illustrating a configuration example of a secondary electron manipulator according to Example 1.

FIG. 5 is a diagram illustrating a configuration example of a secondary electron manipulator according to this example, and a specimen 51 receives the irradiation of the electron beam at the end of a two-dimensional manipulator 52 that is movable on the X axis by a three-axis control piezoelectric element 53. When the two-dimensional manipulator is used, the state where the secondary electrons are integrated at the Y-shaped end in the insulator specimen having a Y-shaped end can be observed. For example, by configuring the biprism and the two-terminal holder at the same time in the transmission electron microscope, when the insulator specimen having the Y-shaped end is fixed to one of the terminals of the two-terminal holder and the specimen is fixed to the other terminal opposite thereto, the manipulator having a protrusion in which the secondary electrons (0 to several 10 eV) are integrated at the end of several 10 nm can be configured. This can also be brought closer to the surface of the specimen to observe the change in the physical properties of the specimen and the like, which becomes a useful measurement method by which, for example, this is brought closer to the surface of a semiconductor and the like to perform the measurement of the physical properties.

Figure 6A:
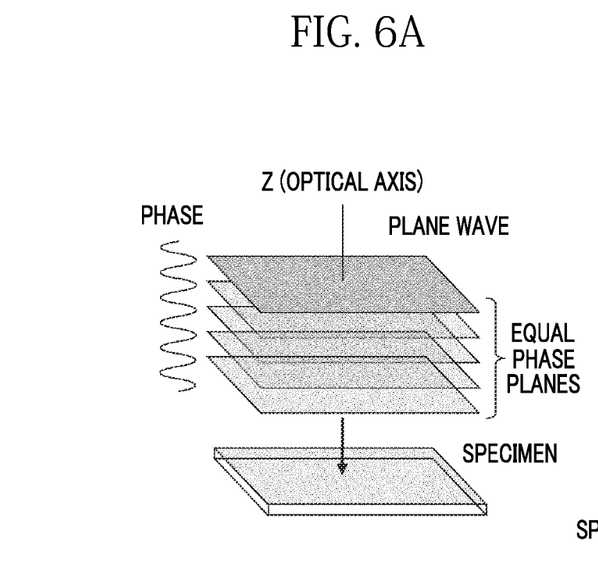
FIGS. 6A to 6C are diagrams for explaining the difference in the specimen incident wave between the conventional art and Example 1.
Figure 6B:
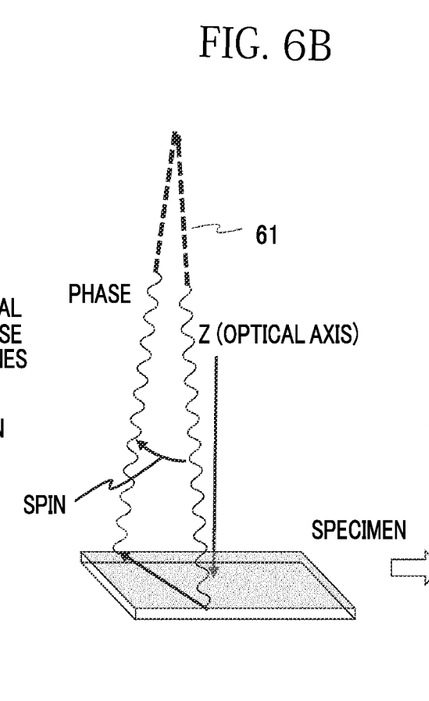
Figure 6C:
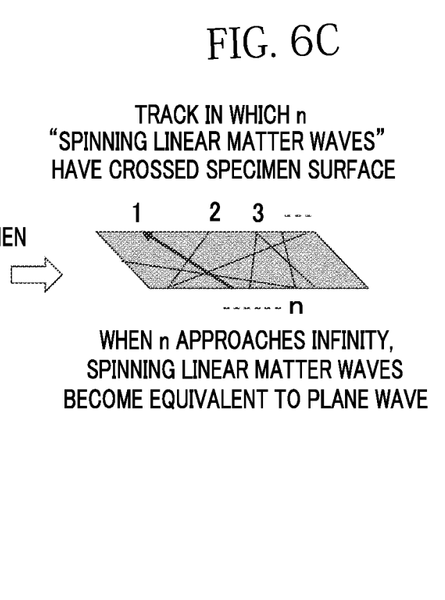

FIGS. 6A, 6B, and 6C are diagrams for explaining the difference in the specimen incident wave between the conventional art and this example, and as illustrated in FIG. 6B, for the specimen incident wave of this example, a spinning linear matter wave 61 travels on the Z axis (optical axis), and is incident on the specimen. As a result, as illustrated in FIG. 6C, n spinning linear matter waves cross the specimen surface, and when n approaches infinity, the spinning linear matter waves become equivalent to the plane wave.

Figure 7A:
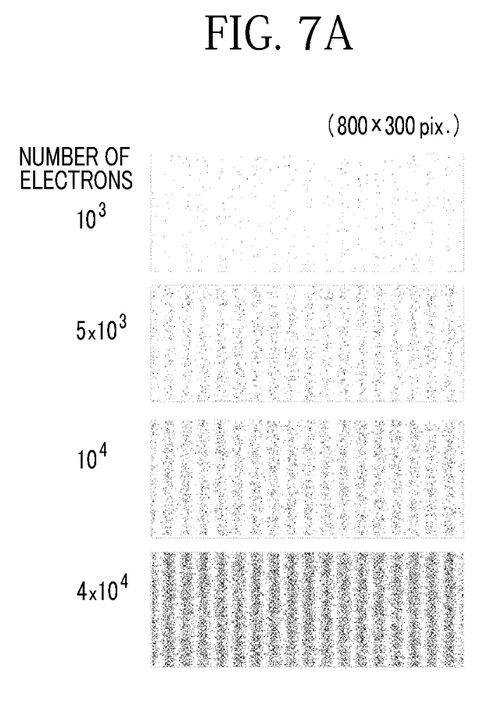
FIGS. 7A and 7B are diagrams illustrating the interference fringes of the simulation results and the actual measurement according to Example 1.
Figure 7B:
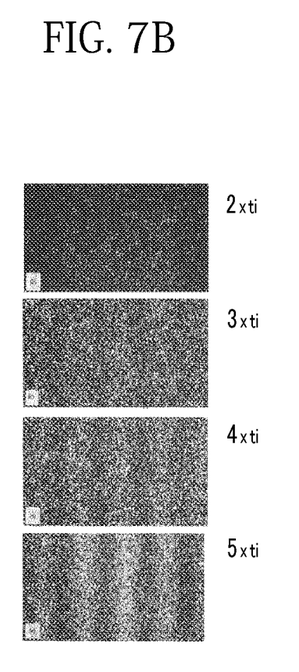

FIGS. 7A and 7B are diagrams illustrating the interference fringes of the simulation results and the actual measurement according to this example, FIG. 7A illustrates the simulations (black points) according to this example, and FIG. 7B illustrates the experiment results (white points) disclosed in NPTL 3. In any case, when the number of points becomes larger, the interference fringe becomes clearer. In this way, in NPTL3, it is proved that the detection point of each electron is accumulated on the detection plane to form the interference image, and the detector detects each electron.

Also, in NPTL4, observation is made of the state of the turbulence of the electric field in which when at the time of irradiating the specimen with the electron beam, the electron that has passed through the specimen stays in the periphery of the specimen or flows back to the surface of the specimen.

It is considered that each electron of the electron beam can be handled as each electron consistently from the electron source to the detection plane, and it is considered that the wave nature that the electron has are involved in the trajectory of the electron.

Figure 8:
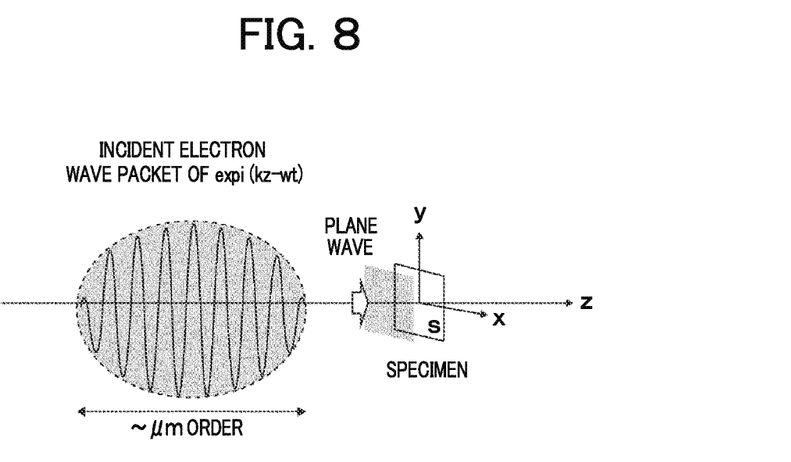
FIG. 8 is a diagram for explaining the simulation of the conventional art.

Subsequently, the difference in the diffraction pattern and the image simulation between the conventional art and this example will be described by using equations with reference to FIGS. 8 and 9. FIG. 8 is a diagram for explaining the simulation of the conventional art, and FIG. 9 is a diagram for explaining the simulation by the spinning linear matter wave according to this example.

First, the handling of the incident electron of the conventional art illustrated in FIG. 8 will be described by using equations (1), (2), and (3). The equation (1) represents the wave function by the handling of the conventional art, and the equation (2) represents its transmission function. Here, σ denotes the interaction constant decided by the wavelength and the acceleration voltage, φ(x, y) denotes the potential distribution of the specimen, and Δt denotes the thickness of the specimen. The equation (3) denotes the scattering (diffraction) intensity of the electron that has transmitted through the specimen.

[Equation 1]

$$\psi(u,v) = \iint q(x,y)\exp[-2\pi i(ux+vy)]dxdy \quad (1)$$

[Equation 2]

$$q(x,y) = \exp(i\sigma\varphi(x,y)\Delta t) \quad (2)$$

σ; the interaction constant decided by the wavelength and the acceleration voltage
φ(x, y); the potential distribution of the specimen
Δt; the thickness of the specimen

[Equation 3]

$$=\psi^*(u,v)\cdot\psi(u,v)\approx|\iint_s q(x,y)\exp[-2\pi i(ux+vy)]dxdy|^2 \quad (3)$$

On the other hand, the equation (4) represents the wave function of the spinning linear matter wave according to this example. Here, $l_1$ denotes the linear region on the specimen. As illustrated in FIG. 9, in the case of this example, it is regarded that the electric charge is present at the center by the spin of the optical speed level of the linear electric charge. By using this electron model, the electron diffraction pattern or the electron wave interference image of the material is interpreted. The transmission function of the equation (4) is as represented in the equation (2). The equation (5) represents the scattering (diffraction) intensity according to this example.

In this example, the direction in which one electron is scattered (diffracted) corresponds to the direction in which the shape of the matter wave is held without being collapsed. This is handled as the degree of the interference of the wave with respect to the line segment region in which the linear matter wave crosses the specimen, that is, the evaluation of the interference and diffraction effect through the wave function.

[Equation 4]

$$\psi_l(u,v)\approx\iint_{l_1} q(x,y)\exp[-2\pi i(ux+vy)]dxdy \quad (4)$$

$l_1$; the linear region on the specimen

[Equation 5]

$$I(u,v) = \frac{1}{m}\left[\sum_{h=1}^{m}\psi_h^*(u,v)\cdot\psi_h(u,v)\right]$$

the number of incident electrons; m→∞

$$\approx|\iint_s q(x,y)\exp[-2\pi I(ux+vy)]dxdy|^2 \quad (5)$$

The interference fringe of the electron beam hologram can be handled as in FIG. 9. The calculation in FIG. 3B is the case where in FIG. 6B, the biprism wire is placed at the specimen position. In the model of the conventional art, the plane wave passes through the wire surface, and the wave surface is tilted with respect to the optical axis by the electric field of the wire, so that the fringe occurs in the tilting direction of the wave surface. In the electron model in FIG. 3B, the electron is not evaluated as the existence probability having a spread on the detection plane, and is represented as the detection point, so that the comparison with the actual measurement data is easily performed from the state where the number of electrons is small, the damage of the specimen by the electron beam can be reduced, and the information of the specimen is easily obtained from the stage where the amount of irradiation is small.

In this electron model, each electron passes through the wire surface while spinning in the random direction, and reaches the hologram plane (equivalent to the detection plane). At this time, as described above, the angle of the direction in which each electron directs can be handled as the evaluation of the interference and diffraction effect using the wave function with respect to the line segment region in which the linear matter wave crosses the wire surface.

Figure 11:
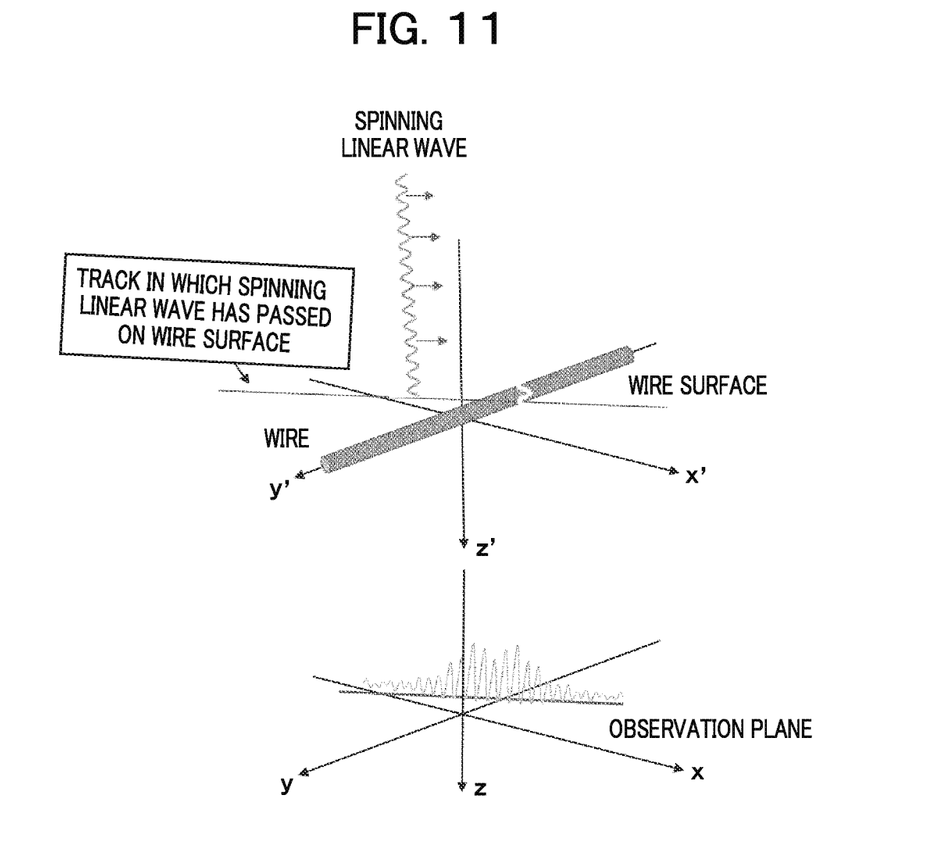
FIG. 11 is a diagram illustrating the relationship between an incident electron beam and a biprism wire.
Figures 12A, 12B:
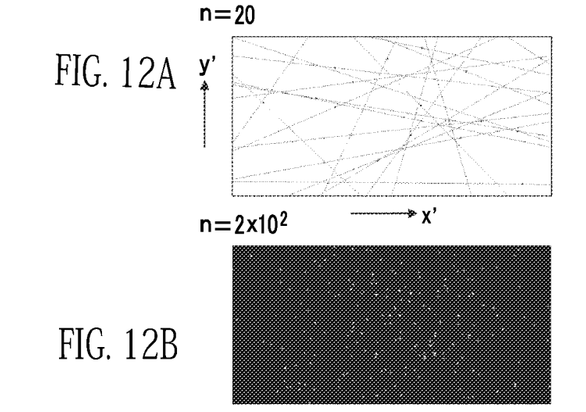
FIGS. 12A to 12F are diagrams illustrating the comparison of the intensity cross sections of the interference fringes observed and the calculated interference fringes.

FIG. 11 is a diagram illustrating the relationship between the incident electron beam and the biprism wire. Part of the intensity cross section interference fringe on the observation plane when the spinning linear wave perpendicularly crosses the wire surface is illustrated. FIGS. 12A to 12E illustrate the simulation results of the interference fringes by the linear spinning waves described above. In FIG. 12A, the results obtained by simulating linear spinning waves that randomly cross the wire surface and 20 electron positions detected on the observation plane corresponding to the respective linear spinning waves are plotted.

Figure 12C:
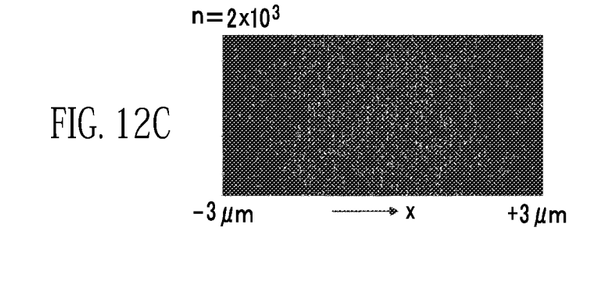
Figure 12D:
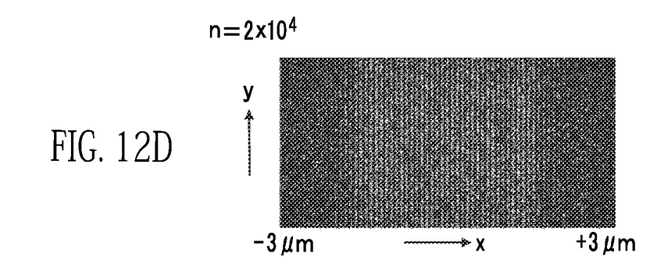

According to the equation (6), the 20 electrons on the image plane can be plotted by estimating the probability that detects the electrons by tracing the random passing tracks of the spinning linear waves. FIGS. 12B, 12C, and 12D are respectively the simulation results of the interference fringes when the numbers of electrons n are $2\times10^2$, $2\times10^3$, and $2\times10^4$. Like the experiment observation, the interference fringe becomes clearer abruptly as the number of incident electron beams increases.

[Equation 6]

$$\Psi^*(u,v)\Psi(u,v)=|\iint q(x,y)\exp(-2\pi i(ux+vy))dxdy|^2 \quad (6)$$

Figure 12E:
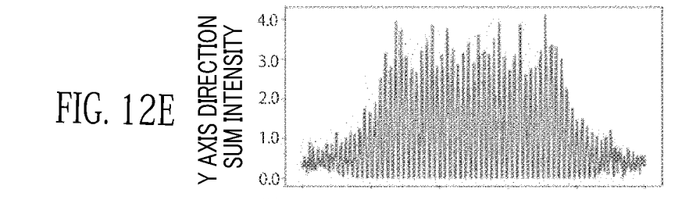
Figure 12F:
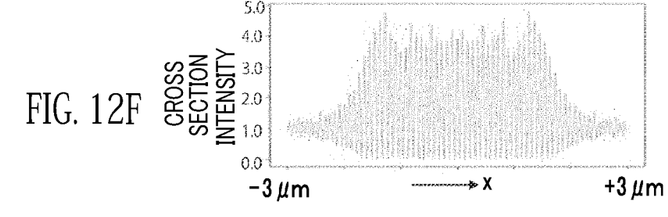
Figure 13:
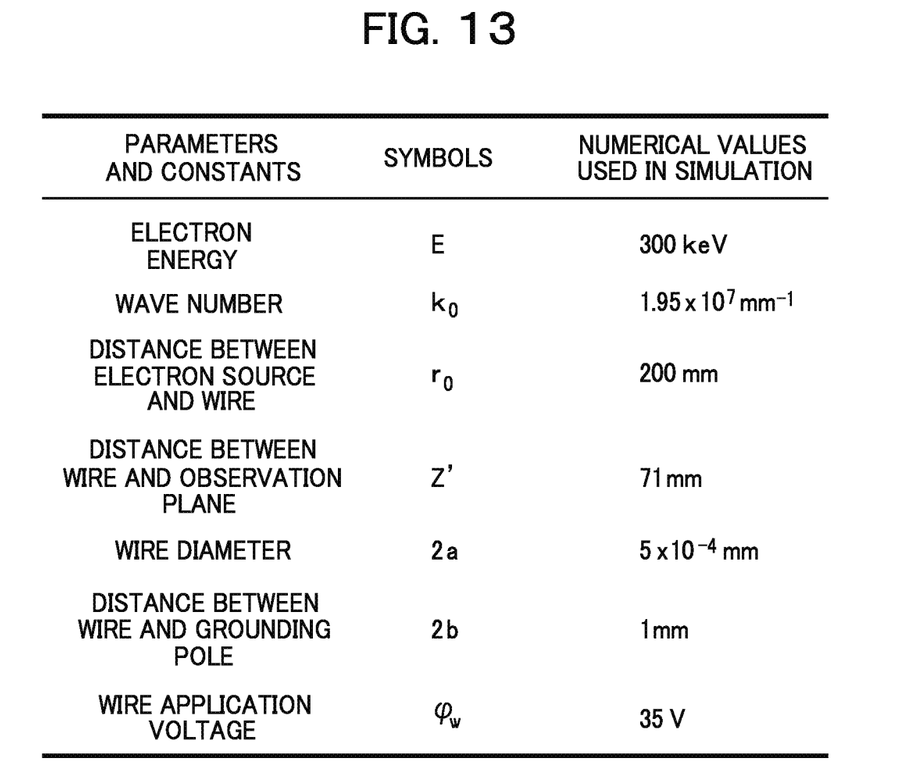
FIG. 13 is a diagram illustrating parameters and constants used for the simulation.

FIG. 12E is a diagram plotting, as a relative value, the number of detected electrons summed in the Y axis direction on the vertical axis in the simulation of FIG. 12D. The plotting diagram coincides well with the intensity distribution calculated by the plane wave illustrated in FIG. 12F, this electron model does not contradict with the experiment results that have been obtained so far, and it can further be said that this electron model can also describe the actual detection condition (the detection of each electron). Note that for all the calculations described here, the parameters illustrated in FIG. 13 are used.

The above example has been described in detail for a better understanding of the present invention, and is not necessarily required to include all the described configurations. Further, the above respective configurations, functions, systems, and the like have been described focusing on the example in which the program that achieves some or all of them is created, but needless to say, some or all of them may be achieved by hardware, by, for example, the designing by an integrated circuit and the like. That is, in place of the program, all or some of the functions of the processing unit may be achieved by the integrated circuit and the like such as ASIC (Application Specific Integrated Circuit) and FPGA (Field Programmable Gate Array).

According to the present invention described above in detail, the microscope image can be obtained in a small amount of electron beam irradiation, and a particularly effective method can be provided for the specimen to be observed that is delicate with respect to the electron beam irradiation, such as a high polymer specimen and a biological specimen.

Note that the inventions disclosed in the present specification include not only the inventions described in claims but also several inventions. Some of the several inventions will be listed below.

<List 1>
An electron microscope analysis system,
wherein the behavior of an electron is interpreted by an electron model on the basis of a spinning linear matter wave (de Broglie wave).

<List 2>
The electron microscope analysis system according to the list 1, wherein the interaction of an electron beam incident on a specimen and the specimen and the behavior of the electron emitted from the specimen are analyzed by using the electron model.

<List 3>

The electron microscope analysis system according to the list 1,
wherein a biprism and a joining holder are configured in a transmission electron microscope, and can be brought closer to a surface of the specimen with confirmation of a state of integration of secondary electrons by an amplitude contrast image of the biprism.

<List 4>

The electron microscope analysis system according to the list 1,
wherein by using the electron model, an electron diffraction pattern or an electron wave interference image of a material is interpreted.

<List 5>

The electron microscope analysis system according to the list 1,
wherein a device that obtains the electron diffraction pattern or the electron microscope image obtained from the specimen by using the electron beam analyzes the obtained result on the basis of the interpretation of the electron model, and simulates a structure, a constituent atom, and the like of the specimen.

<List 6>

The electron microscope analysis system according to the list 1,
wherein a fine structure information of an electron beam irradiation portion of the specimen is obtained by comparing a simulation of the electron diffraction pattern, the electron microscope image, or the like using the electron model with the electron diffraction pattern or the electron microscope image that is actually obtained.

<List 7>

The electron microscope analysis system according to the list 1,
wherein information of irradiation of the specimen is obtained in a low amount of electron irradiation by comparing the simulation of the electron diffraction pattern, the electron microscope image, or the like using the electron model with the electron diffraction pattern or the electron microscope image that is actually obtained.

REFERENCE SIGNS LIST

11 . . . electron trajectory,
31 . . . route (track),
41 . . . specimen holder,
42 . . . two-dimensional detector,
43 . . . irradiation electron source control system,
44 . . . monitor,
51 . . . specimen,
52 . . . two-dimensional manipulator,
53 . . . two-dimensional control piezoelectric element,
61 . . . spinning linear matter wave

The invention claimed is:

1. An electron microscope analysis system, comprising:
a detector that captures an electron microscope image formed on a detection plane by applying an electron beam onto a specimen and transmitting the electron beam through the specimen,
wherein the electron beam that forms the electron microscope image is analyzed by using an electron model having a linear matter wave (de Broglie wave) that spins about a predetermined point on the irradiation beam.

2. The electron microscope analysis system according to claim 1, further comprising:
a transmission electron microscope having a biprism and a specimen holder having a secondary electron manipulator configured to be brought closer to a surface of the specimen with the confirmation of a state of integration of secondary electrons by an amplitude contrast image of the biprism.

3. The electron microscope analysis system according to claim 1,
wherein by using the electron model, an electron diffraction pattern or an electron wave interference image of a matter is interpreted.

4. The electron microscope analysis system according to claim 1,
wherein an electron diffraction pattern or the electron microscope image obtained from the specimen by using the electron beam is analyzed on the basis of the electron model, and a structure and a constituent atom of the specimen are simulated.

5. The electron microscope analysis system according to claim 1,
wherein a simulation of an electron diffraction pattern or the electron microscope image using the electron model is compared with the electron diffraction pattern or the electron microscope image of the specimen that is actually obtained.

* * * * *